US008972055B1

(12) United States Patent
Desai et al.

(10) Patent No.: US 8,972,055 B1
(45) Date of Patent: Mar. 3, 2015

(54) METHODS AND SYSTEMS FOR SELECTING A VELOCITY PROFILE FOR CONTROLLING A ROBOTIC DEVICE (75) Inventors: Munjal Desai, Mountain View, CA (US); Ryan Hickman, Mountain View, CA (US); Thor Lewis, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 740 days.

(21) Appl. No.: 13/213,705

(22) Filed: Aug. 19, 2011

(51) Int. Cl.
*G05B 19/18* (2006.01)
(52) U.S. Cl.
USPC ........... 700/250; 700/245; 700/257; 700/264; 318/568.18; 901/1
(58) Field of Classification Search
CPC ........... G05B 19/4068; G05B 19/4069; G05B 2219/36171; G05B 2219/42171; G05B 2219/43176; G05B 2219/36516; G05B 2219/42175; G05B 2219/43034; G05B 2219/43036; G05B 2219/43074; G05B 2219/43088; G05D 1/0223; G05D 1/0212
USPC ......... 700/245, 248, 250, 252, 253, 256, 257, 700/260, 261, 264; 318/568.12, 568.18; 715/834; 901/1
See application file for complete search history.

(56) References Cited

U.S. PATENT DOCUMENTS

| 4,829,219 A * | 5/1989 | Penkar .................... 318/568.18 |
| 2007/0032890 A1* | 2/2007 | Zhou et al. ...................... 700/63 |
| 2010/0084513 A1* | 4/2010 | Gariepy et al. ............... 244/190 |
| 2012/0316676 A1* | 12/2012 | Fouillade et al. ............ 700/246 |

* cited by examiner

*Primary Examiner* — Spencer Patton
(74) *Attorney, Agent, or Firm* — McDonnell Boehnen Hulbert & Berghoff LLP (57) ABSTRACT Methods and systems for selecting a velocity profile for controlling a robotic device are provided. An example method includes receiving via an interface a selection of a robotic device to control, and receiving via the interface a request to modify a velocity profile of the robotic device. The velocity profile may include information associated with changes in velocity of the robotic device over time. The method may further include receiving a selected velocity profile, receiving an input via the interface, and determining a velocity command based on the selected velocity profile and the input. In this manner, changes in velocity of the robotic device may be filtered according to a velocity profile selected via the interface.

25 Claims, 9 Drawing Sheets

METHODS AND SYSTEMS FOR SELECTING A VELOCITY PROFILE FOR CONTROLLING A ROBOTIC DEVICE

FIELD

This disclosure may relate to telerobotics, and in examples, to velocity profiles for controlling a robotic device.

BACKGROUND

Tele-operation may refer to operating a machine at a distance. While tele-operation may be applied to a wide range of situations for operating a device or machine from a distance, tele-operation is commonly encountered in research, academic, and technical environments associated with robotics and mobile robots. Such operation of robots from a distance is the focus of an area of robotics denoted as telerobotics.

One application of telerobotics includes the use of robots for space exploration, using telerobotics space probes, telescopes, or exploration rovers. Similarly, remotely operated vehicles utilize telerobotics to work in deep marine environments. Additionally, researchers are investigating the use of telerobotics in the fields of medical devices and minimally invasive surgical systems.

Telerobotics often involves visual and control components using wireless or wired connections with the robot. A remote camera or other imaging device may provide a visual representation of a view from the robot's location. Additionally, an interface may allow a user to control operation of the robot at a distance. For example, a simple interface may be a mouse-monitor-keyboard interface. In some examples, the interface may also include a joystick.

SUMMARY

This disclosure may disclose, inter alia, systems and methods for selecting a velocity profile for controlling a robotic device.

In one example, a method is provided that may comprise receiving via an interface on a device a selection of a robotic device to control, and receiving via the interface a request to modify a velocity profile of the robotic device. The velocity profile may comprise information associated with controlling changes in velocity of the robotic device over time. The method may also include receiving a selection of a velocity profile from a plurality of velocity profiles. Additionally, the method may include receiving an input via the interface indicating a command for controlling the robotic device including a change in velocity, and determining a velocity command for the robotic device based on the selected velocity profile and the input. The velocity command may include information associated with implementing the change in velocity over time.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a non-transitory computer-readable medium having stored thereon instructions executable by a computing device to cause the computing device perform functions is provided. The functions may comprise receiving via an interface on a device a selection of a robotic device to control, and receiving via the interface a request to modify a velocity profile of the robotic device. The velocity profile may comprise information associated with controlling changes in velocity of the robotic device over time. The functions also may comprise receiving a selection of a velocity profile from a plurality of velocity profiles. Additionally, the functions may include receiving an input via the interface indicating a command for controlling the robotic device including a change in velocity, and determining a velocity command for the robotic device based on the selected velocity profile and the input. The velocity command may include information associated with implementing the change in velocity over time.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In another example, a system is provided. The system includes a memory and a processor coupled to the memory. The system further includes include instructions stored in the memory and executable by the processor to perform functions. The functions may comprise receiving via an interface on a device a selection of a robotic device to control, and receiving via the interface a request to modify a velocity profile of the robotic device. The velocity profile may comprise information associated with controlling changes in velocity of the robotic device over time. The functions also may comprise receiving a selection of a velocity profile from a plurality of velocity profiles. Additionally, the functions may include receiving an input via the interface indicating a command for controlling the robotic device including a change in velocity, and determining a velocity command for the robotic device based on the selected velocity profile and the input. The velocity command may include information associated with implementing the change in velocity over time.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for selecting a velocity profile for controlling a robotic device. An example method includes receiving via an interface on a device a selection of a robotic device to control, and receiving via the interface a request to modify a velocity profile of the robotic device. The velocity profile may comprise information associated with controlling changes in velocity of the robotic device over time. The method may also include receiving a selection of a velocity profile from a plurality of velocity profiles. In some examples, a selection of a first velocity profile and a second velocity profile may be received. The first velocity profile may be associated with accelerations, and the second velocity profile may be associated with decelerations. In other examples, a display of the plurality of velocity profiles may be generated. The display of the plurality of velocity profiles may comprise graphical representations of the plurality of velocity profiles, for example, and the velocity profile may be selected from the display.

Additionally, the method may include receiving an input via the interface indicating a command for controlling the robotic device, and determining a velocity command for the robotic device based on the selected velocity profile and the input. In one example, the input may indicate information associated with a change in velocity, and the change in velocity may be filtered using the selected velocity profile. For example, the velocity command may include information associated with implementing the change in velocity over time.

Figure 1:
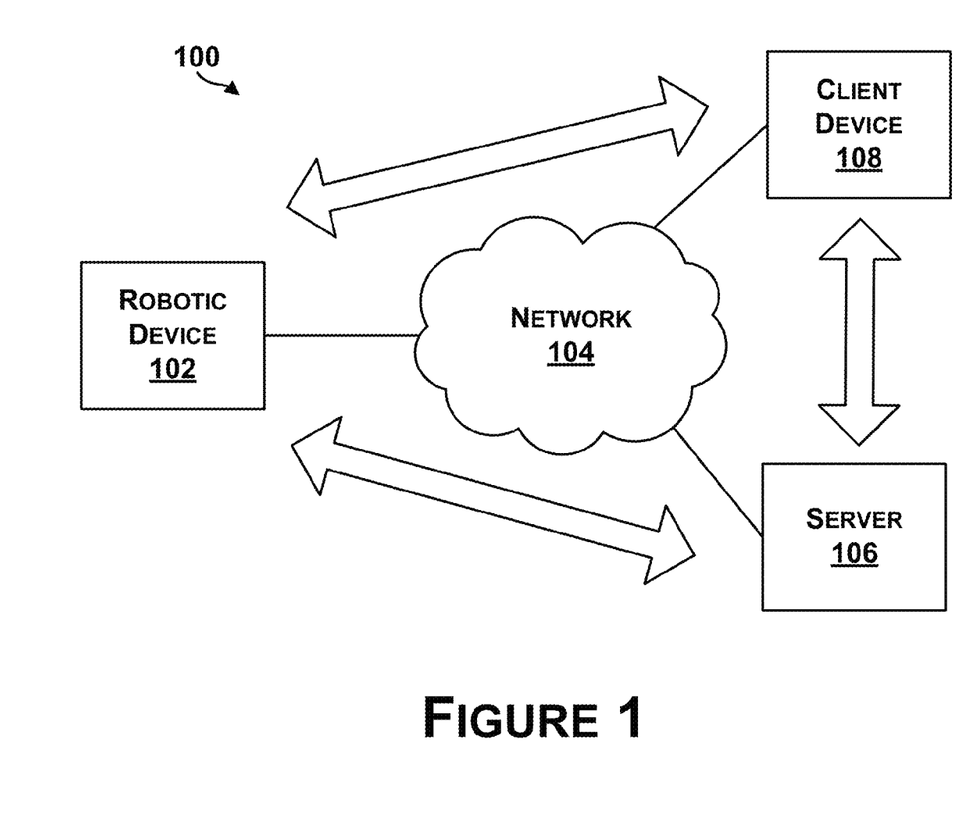
FIG. 1 illustrates an example system for selecting a velocity profile for controlling a robotic device.

Referring now to the figures, FIG. 1 is an example system 100 for controlling a robotic device. The system 100 includes a robotic device 102 coupled to a network 104, and a server 106 and a client device 108 also coupled to the network 104. The robotic device 102 may further be coupled directly (or indirectly) to the server 106 and the client device 108 as shown. The system 100 may include more of fewer components, and each of the robotic device 102, the server 106, and the client device 108 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1.

The system 100 may enable cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example. Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

The system 100 includes a number of devices coupled to or configured to be capable of communicating with the network 104. Of course, more or fewer client devices may be coupled to the network 104. In addition, different types of devices may be coupled to the network 104. For example, any of the devices may generally comprise a display system, memory, and a processor.

Any of the devices shown in FIG. 1 may be coupled to the network 104 or to each other using wired or wireless communications. For example, communication links between the network 104 and devices may include wired connections, such as a serial or parallel bus. Communication links may also be wireless links, which may include Bluetooth, IEEE 802.11 (IEEE 802.11 may refer to IEEE 802.11-2007, IEEE 802.11n-2009, or any other IEEE 802.11 revision), or other wireless based communication links. In other examples, the system 100 may include access points through which the devices may communicate with the network 104. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the robotic device 102, the server 106, and the client device 108 may include a wired or wireless network interface through which the devices can connect to the network 104 (or access points). As an example, the devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The network 104 may represent a networked computer architecture, and in one example, the network 104 represents a queue for handling requests from client devices. The network 104 may further include any of a local area network (LAN), wide area network (WAN), wireless network (Wi-Fi), or Internet, for example.

The server 106 may be a component coupled to the network 104 (as shown), or a component of the network 106 depending on a configuration of the system 100. The server 106 may include a processor and memory including instructions executable by the processor to perform functions as described herein.

The client device 108 may include any type of computing device (e.g., PC, laptop computer, tablet computer, etc.), or any type of mobile computing device (e.g., laptop, mobile telephone, cellular telephone, tablet computer, etc.). The client device 108 may include a processor and memory including instructions executable by the processor to perform functions as described herein.

The robotic device 102 may comprise any computing device that may include connection abilities to the network 104 and that has an actuation capability (e.g., electromechanical capabilities). A robotic device may further be a combination of computing devices. In some examples, the robotic device 102 may collect data and upload the data to the network 104. The network 104 may be configured to perform calculations or analysis on the data and return processed data to the robotic device 102.

Any of the client devices may include additional components. For example, the robotic device 102 may include one or more sensors, such as a gyroscope, an accelerometer, or distance sensors to measure movement of the robotic device 102. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the robotic device 102, the server 106, and the client device 108 may include an integrated user-interface (UI) that allows a user to interact with the device. For example, the robotic device 102 may include various buttons and/or a touchscreen interface that allow a user to provide input. As another example, the robotic device 102 may include a microphone configured to receive voice commands from a user. Furthermore, the robotic device 102 may include one or more interfaces that allow various types of user-interface devices to be connected to the robotic device 102.

Figure 2A:
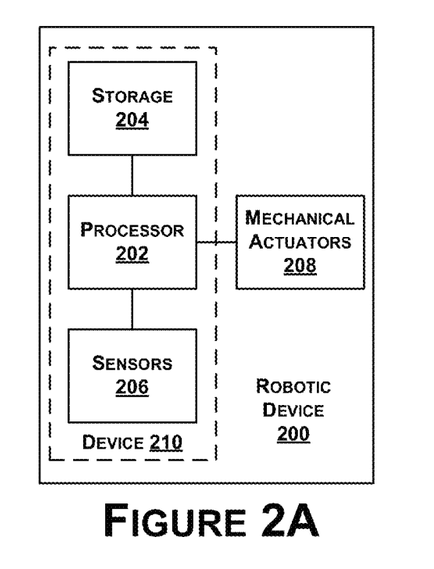
FIGS. 2A-2C are example illustrations of robotic devices.

FIG. 2A illustrates an example robotic device 200. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

Figure 2B:
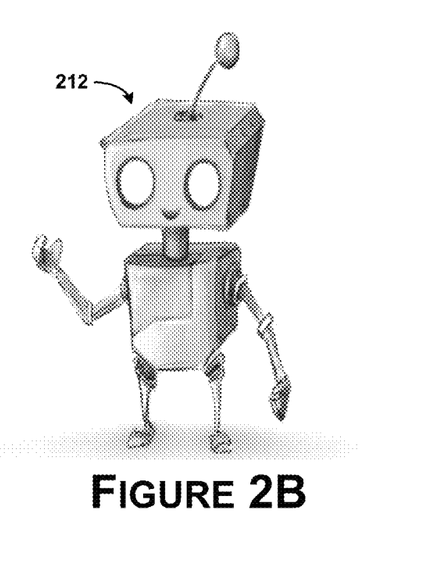

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

Figure 2C:
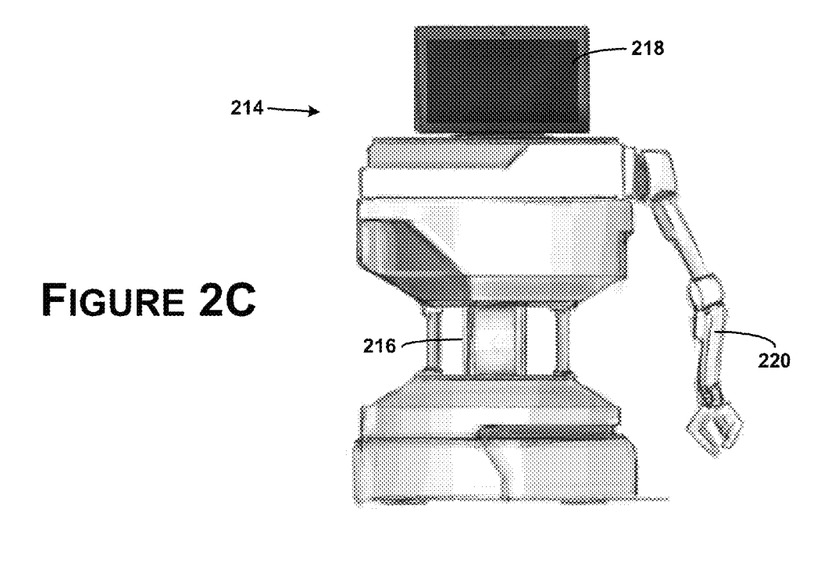

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Any of the robots illustrated in FIGS. 2A-2C may be configured to operate according to example methods described herein, or according to instructions received from devices that may be configured to operate according to example methods described herein.

Figure 3:
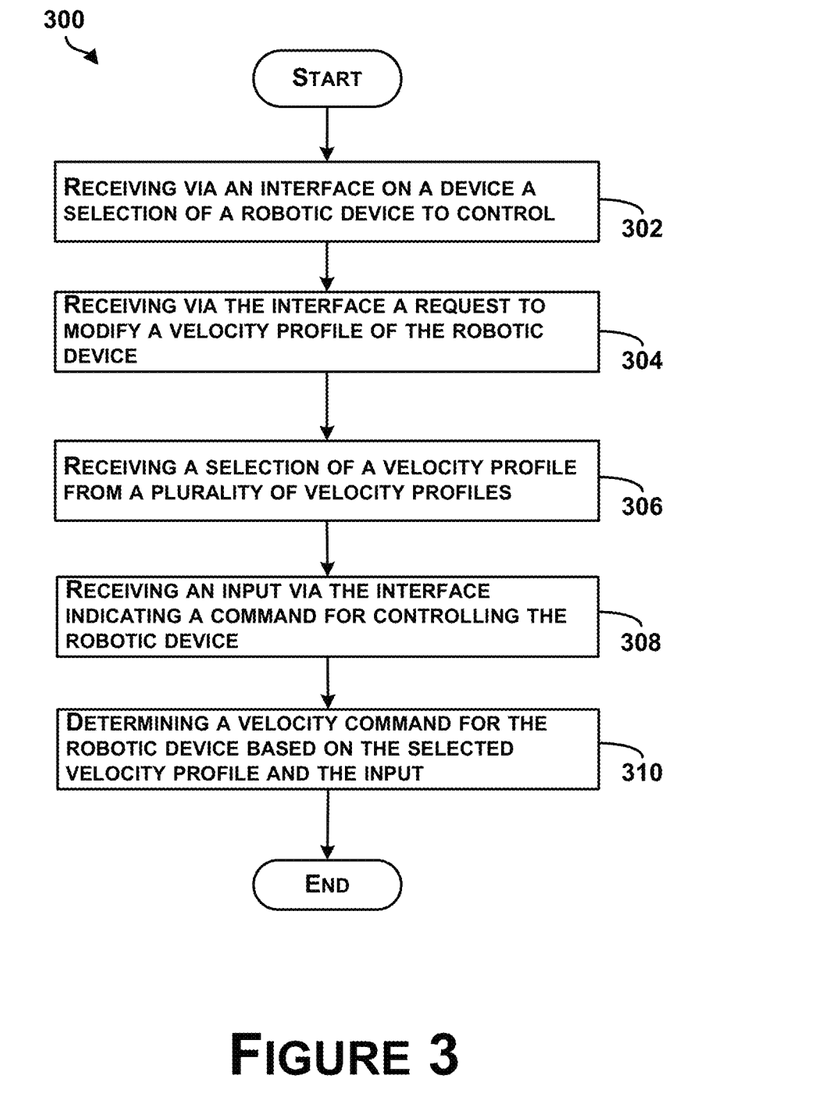
FIG. 3 is a block diagram of an example method of selecting a velocity profile for controlling a robotic device, in accordance with at least some embodiments described herein.

FIG. 3 is a block diagram of an example method 300 of selecting a velocity profile for controlling a robotic device. Method 300 shown in FIG. 3 presents an embodiment of a method that could be used with the system 100, for example, and may be performed by a device, such as any devices illustrated in FIGS. 1-2, or components of the device. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving via an interface on a device a selection of a robotic device to control. The robotic device may include any type of robotic device, including robotic devices that may be configured to turn in place or not, robotic devices that may be stationary or mobile, or have other functionality or limitations, for example.

In one example, the selection of the robotic device may be automatically determined based on a robotic device connected to the interface on the device. In another example, a user may start an application and designate the robotic device (e.g., by selecting the robotic device from among a plurality of robotic devices, inputting information associated with an identity of the robotic device, etc.).

In some examples, the interface is provided on a device that is remote from the robotic device. The device may be operated to control the robotic device from a remote location. For example, the device may be any type of computing device (e.g., PC, laptop computer, tablet computer, etc.), or any type of mobile computing device (e.g., laptop, mobile telephone, cellular telephone, tablet computer, etc.). Thus, the interface may take the form of an interface enabling a user to remote control the robotic device using the device.

In one example, the interface may be provided on a touchscreen display of a device, and the device may receive an input to the interface via a touch/contact to the touchscreen by a user or stylus. As another example, the interface may include a graphical user interface (GUI) of a device, and the device may receive an input to the interface via an input to a keyboard or mouse coupled to the device. As still another example, the interface may be a general interface to a device, and the device may receive an input via receiving a signal (via a wireless or wired connection) to the interface (e.g., which may take the form of a receiver, a port, etc.).

At block 304, the method 300 includes receiving via the interface a request to modify a velocity profile of the robotic device. For example, a user may access information associated with the velocity profile via a settings menu of the interface. In some examples, the velocity profile may include information associated with controlling changes in velocity of the robotic device over time. The changes in velocity may be associated with controlling movement of the robotic device while navigating an environment and/or controlling operation of a pan/tilt device (e.g., a camera) of the robotic device. In an absence of velocity profiles, outputs of motor controllers of the robotic device may result in instantaneous accelerations or decelerations, and jerky movements for the robotic device or the pan/tilt device. Thus, a user may desire to modify one or more velocity profiles of the robotic device to increase control over accelerations and decelerations of the robotic device.

At block 306, the method 300 includes receiving a selection of a velocity profile from a plurality of velocity profiles. In one example, the selected velocity profile may apply to both accelerations and decelerations. In other examples, multiple selected velocity profiles may be received. For example, a first velocity profile may be associated with accelerations and a second velocity profile may be associated with decelerations. In some examples, separate velocity profiles may be received for movement of the robotic device and control of the pan/tilt device.

In some examples, the selection of the velocity profile may occur via the interface on the device. The selection of the velocity profile may occur in other manners as well, such as by receiving a signal from a device with information indicating the selection. The signal may be received at the device including the interface (e.g., referred to in block 302), or at a separate device that is configured to operate or control the robotic device, for example.

At block 308, the method 300 includes receiving an input via the interface indicating a command for controlling the robotic device. The command may include a change in velocity for controlling movement of the robotic device or the pan/tilt device, for example.

In one example, the interface may be configured to indicate or receive a command for movement of the robotic device in a given direction and/or a given velocity. In another example, the interface may also be configured to indicate or receive a command for an orientation of the pan/tilt device on the robotic device. Thus, inputs to the interface may be associated with movement of the robotic device and/or orientations of the pan/tilt device on the robotic device.

At block 310, the method 300 includes determining a velocity command based on the selected velocity profile and the input. In one example, changes in velocity indicated by the input may be filtered using the selected velocity profile prior to sending the velocity command to the robotic device.

For example, an input may indicate a sudden increase in velocity while driving the robotic device in a forward direction, and a velocity command due to the input may be filtered to indicate a gradual or smooth acceleration to an increased velocity, rather than an instant acceleration. Similarly, the velocity command may indicate a gradual deceleration when approaching the increased velocity, rather than an instant deceleration to the increased velocity.

In another example, an input may indicate to pan a device on the robotic device from left to right, moving from a stationary position to a new position. Rather than instantly accelerating from the stationary position at a constant acceleration, a velocity command due to the input may be filtered to indicate a gradual acceleration from rest (i.e., zero velocity) at the stationary position to a magnitude of velocity, and a gradual deceleration from the magnitude of velocity to rest at the new position.

According to the method 300, the interface may include a graphical user interface displayed on a touchscreen. The graphical user interface may be operable to receive information associated with a contact of the touchscreen and determine a velocity command based on the information associated with the contact.

In one example, a display of an indicator may be generated on the touchscreen and at a location of the contact of the touchscreen. A distance from a location of the indicator to a reference point on the graphical user interface may represent a magnitude of velocity associated with the input. A display of a second indicator may also be generated on the touchscreen. A distance from a location of the second indicator to the reference point on the graphical user interface may represent a second magnitude of velocity associated with the velocity command. The location of the second indicator may approach the location of the contact of the touchscreen over time based on the velocity command. In an instance in which an input indicates a change in velocity, the indicator may represent the desired velocity, and the second indicator may provide feedback about an actual change in velocity associated with the velocity command, as determined based on the selected velocity profile.

In one example, the method 300 may also include receiving a selection of a first velocity profile associated with acceleration, and receiving a selection of a second velocity profile associated with decelerations. The velocity command may be determined based on the first velocity profile when the input indicates acceleration, and the velocity command may be determined based on the second velocity profile when the input indicates a deceleration. In some examples, an input may implicitly indicate an acceleration and a deceleration and portions of a velocity command may be determined by the first or second velocity profile as appropriate. For example, an input may include a command to pan a camera on the robotic device from a first position to a second position. The camera may be at rest at the first position, require an acceleration to a velocity while panning towards the second position, and require a deceleration from the velocity to rest (i.e., zero velocity) at the second position. The acceleration and deceleration may be filtered based on the first and second velocity profiles respectively during the panning of the camera.

In another example, the method 300 may include generating a control signal indicating the velocity command, and providing the control signal to the robotic device. The control signal may be generated according to a variety of methods and forms, wherein a particular method and form are determined based on a configuration of the robotic device for receiving velocity and directional orientation information and/or panning or tilting information for a device on the robotic device.

In yet another example, the method 300 may include receiving information associated with an environment in which the robotic device is operating and/or parameters of the robotic device and determining a velocity command based on the environment and/or parameters. For example, the information associated with the environment may comprise a distance to an object in the environment, an identification of a user in the environment, an elevation profile of an environment, or other information associated with the environment. The parameters of the robotic device may include static parameters such as weight, payload, and torque associated with motor controllers, and dynamic parameters such as power consumption and heat dissipation among other possible parameters. In some examples, an environment velocity profile may be selected based on the environment and/or the parameters of the robotic device. The velocity command may be determined based on the environment velocity profile.

In other examples, the interface may be modified based on the information associated with the environment. For example, the interface may be a touchscreen comprising a graphical user interface operable to receive information associated with a contact of the touchscreen. A velocity command may be determined based on the information associated with the contact. The graphical user interface may be modified by zooming in the graphical user interface such that a portion of the graphical user interface operable to receive contact indicative of velocity commands associated with a velocity above a threshold may be out of sight on the graphical user interface. Thus, a user interacting with the graphical user interface could be limited to inputting velocities below the threshold based on the information associated with the environment.

In still another example, the method 300 may include receiving a selection of another robotic device to control via the interface, and determining another velocity command based on the selected velocity profile. For example, an application may be switched to control a second robotic device. An input may be received via the interface, and a velocity command for the second robotic device may be determined based on the selected velocity profile and the input. Thus, a selected velocity profile may be applied to a number of robotic devices controlled by the interface. In other examples, the interface may store a selected velocity profile associated with each of a plurality of robotic devices in a memory. The selected velocity profile for a particular robotic device may be retrieved when controlling the particular robotic device. In another example, the interface may be configured for a particular robotic device based on the selected velocity profile.

Figure 4A:
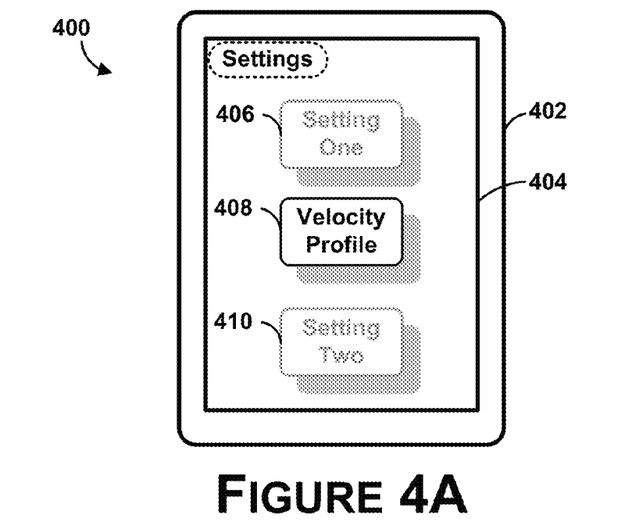
FIGS. 4A-4B are example conceptual illustrations of selecting a velocity profile.
Figure 4B:
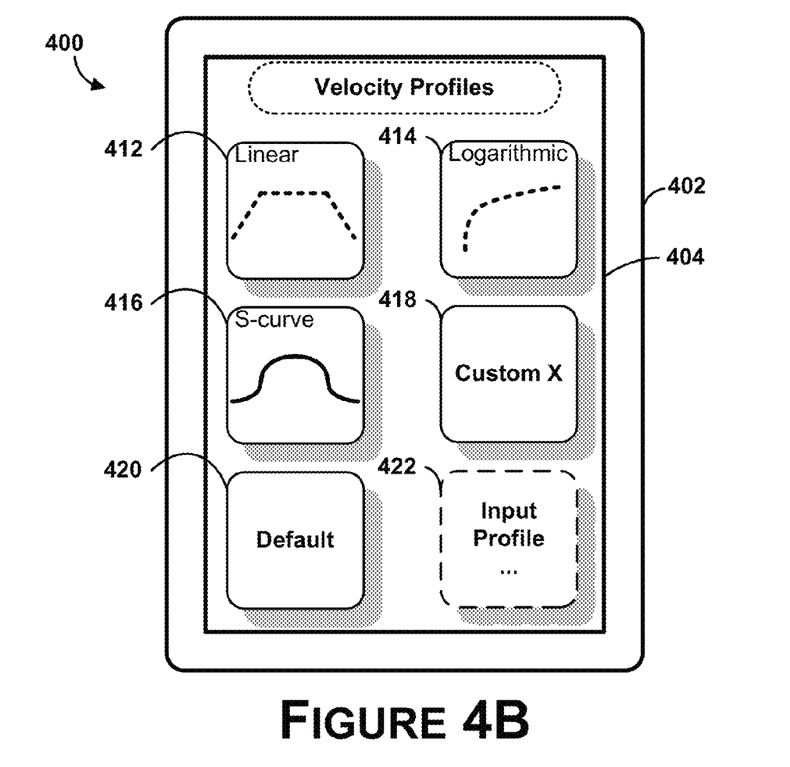

Referring now to FIGS. 4A-4B, FIGS. 4A-4B are example conceptual illustrations of selecting a velocity profile. An interface 400 may be provided on a device 402 that includes a display 404. The device 402 may include a touchscreen, for example. As shown in FIG. 4A, the display 404 of the interface 400 may include icons 406, 408, and 410 for modifying settings associated with the interface 400. In some examples, a user may select the velocity profile icon 408 to modify a velocity profile (e.g., by selecting the icon 408).

In one example, upon receiving a request to modify a velocity profile, the display 404 may include a plurality of velocity profiles as shown in FIG. 4B. FIG. 4B includes graphical representations of the plurality of velocity profiles. In some examples, the graphical representations may include two-dimensional graphs of velocity versus time, representing how changes in velocity may be implemented over time. For example, graphical representation indicates a linear velocity profile 412, such that a constant and instantaneous acceleration or deceleration is applied when changing from one velocity to a second velocity. A graphical representation may indicate a logarithmic profile 414 that includes a change in velocity over time associated with varying levels of accelerations and/or decelerations.

Another graphical representation may indicate an s-curve velocity profile 416. The s-curve velocity profile may be described by 7 distinct phases or segments implemented when increasing, for example, from zero velocity to a first velocity, and decreasing from the first velocity to zero velocity. A first phase may involve an increasing acceleration from zero to a constant acceleration implemented in a second phase. The third phase may involve a decreasing acceleration to reach the fourth phase, a constant velocity. The fifth phase, sixth phase, and seventh phase may involve an increasing deceleration to a constant rate of deceleration, and a decreasing acceleration to zero velocity. The s-curve velocity profile 416 may be desired, for example, for implementing smooth transitions in velocity, as compared to the instantaneous changes in velocity associated with the linear velocity profile.

However, other velocity profiles are also possible including asymmetric velocity profiles or exponential velocity profiles, among other possible velocity profiles suitable for implementing changes in velocity. In some examples, the display 404 may include separate menus or screens for selecting velocity profiles associated with accelerations and decelerations, as well as velocity profiles associated with movements of the robotic device or panning/tilting of a device on the robotic device.

The plurality of velocity profiles may also be displayed as textual representations, as shown, for example, by icons 418 and 420. In some examples, the display 404 may include an input module 422 for receiving an additional velocity profile. A user may input information associated with characteristics of the additional velocity profile, and the additional velocity profile may be included with the plurality of velocity profiles. The characteristics of the additional velocity profile may include, for example, fixed points of a graph of velocity over time, an expression providing velocity as a function of time, thresholds for values of acceleration or deceleration, etc.

Figure 5A:
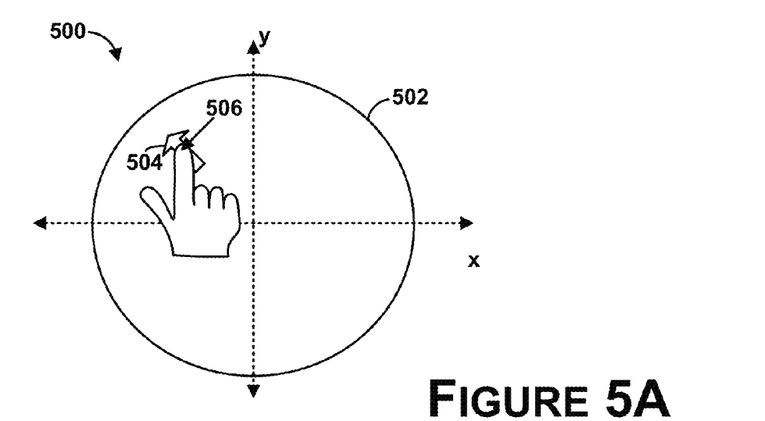
FIGS. 5A-5C are example illustrations of an interface.
Figure 5B:
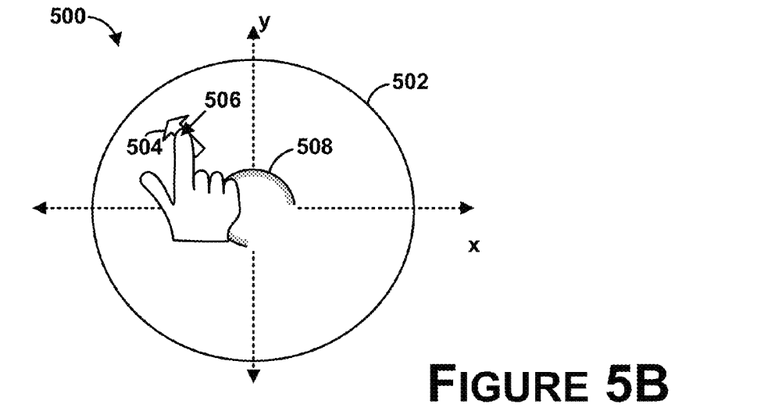
Figure 5C:
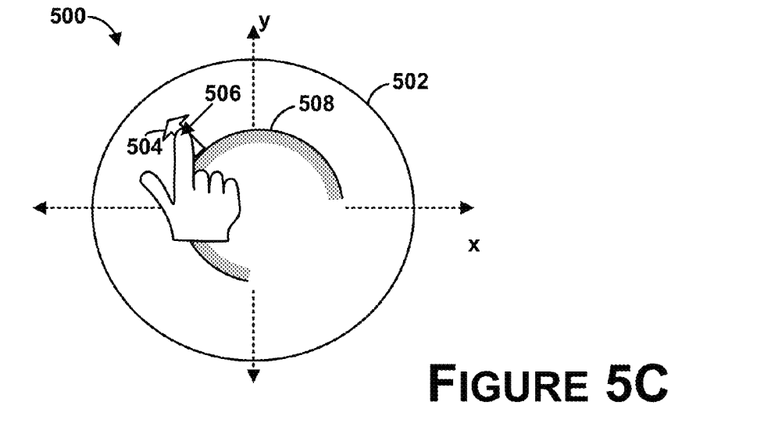

FIGS. 5A-5C are example illustrations of an interface 500. The interface 500 may be provided on a display of a touchscreen, and may be configured to receive inputs and correlate the inputs to commands for velocity and directional orientation of a robotic device remote from the touchscreen. The interface 500 may be configured to provide feedback about actual changes in velocity associated with a velocity command, determined based on a selected velocity profile, as compared with an indicated magnitude of velocity.

The interface 500 may include a circle 502 that may be representative of a range of velocity and a range of directional orientation of a robotic device. As shown in FIG. 5A, the interface 500 may generate a display of an indicator 504 representing an input received from a user's finger or from a stylus at a location 506. Although the indicator 504 is indicated with an icon of an arrow, the indicator 504 may be represented by an icon with any of a variety of designs or shapes.

In one example, the touchscreen may comprise a graphical user interface operable to receive the input and determine information associated with absolute position of the input with respect to a coordinate system of the graphical user interface. For example, a velocity command and a direction command may be associated with the input based on the absolute position.

In some examples, a distance from the location 506 to a center of the circle 502 may represent information associated with a velocity command. For example, a direct relationship between a ratio of the distance and a radius of the circle 502 may correspond to a relative velocity command for controlling the robotic device (e.g., when the distance is half of the radius of the circle 502 the ratio may be 1:2 or one-half, and the velocity command may be indicative of movement at 50% of the maximum speed of the robotic device).

In some examples, an angle with respect to the location 506 and a coordinate system of the interface 500 may represent information associated with a direction command. For example, in a configuration where the interface is oriented such that an input on a positive y-axis or top of the circle 502 is associated with movement of the robotic device straight forward, an input received at the location 506 may be indicative of a directional orientation input causing the robotic device to attempt to turn to the left.

As shown in FIG. 5B, a magnitude circle 508 may provide feedback about a magnitude of velocity associated with the velocity command. For example, a robotic device may be at rest (i.e., not moving). A user may contact the touchscreen at the location 506 to indicate a desire to move the robotic device with a given velocity. Based on a selected velocity profile, a velocity command may be determined, indicating information associated with changing the velocity of the robotic device from zero to the given velocity.

The magnitude circle 508 may illustrate a magnitude of velocity at an instance in time as a magnitude of velocity associated with the velocity command increases over time. The magnitude of velocity may be determined, for example, based on a direct relationship between the radius of the magnitude circle 508 and a distance from the indicator 504 to the center of the circle 502.

In some examples, the radius of the magnitude circle 508 may increase, such that the radius of the magnitude circle 508 approaches the distance between the indicator 504 and the center of the circle 502 over time. As shown in FIG. 5B, the radius of the magnitude circle 508 is about 25% of the distance from the indicator 504 to the center of the circle 502 at a first instance in time. Thus, the magnitude of velocity associated with the velocity command at the instance in time may be determined to be about 25% of the given velocity at the first instance in time.

As shown in FIG. 5C, the radius of the magnitude circle 508 is about 75% of the distance from the indicator 504 to the center of the circle 502 at a second instance in time. Thus, the magnitude of velocity associated with the velocity command at the second instance in time may be determined to be about 75% of the given velocity.

Figure 6A:
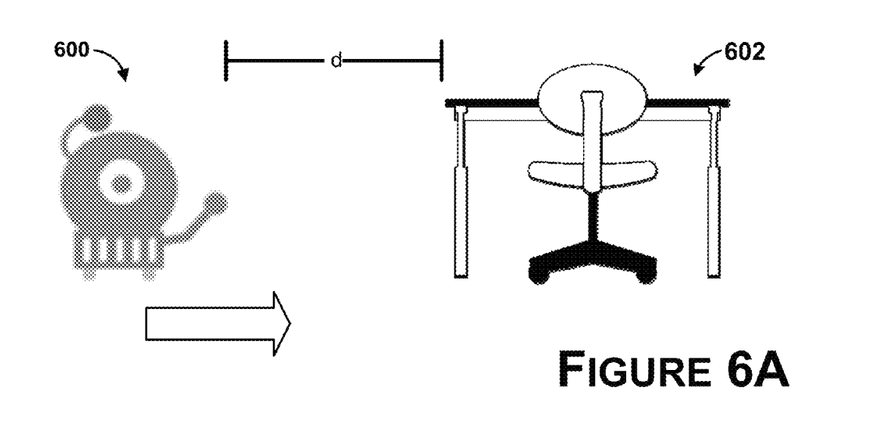
FIGS. 6A-6C are example conceptual illustrations of a robotic device in an environment.
Figure 6B:
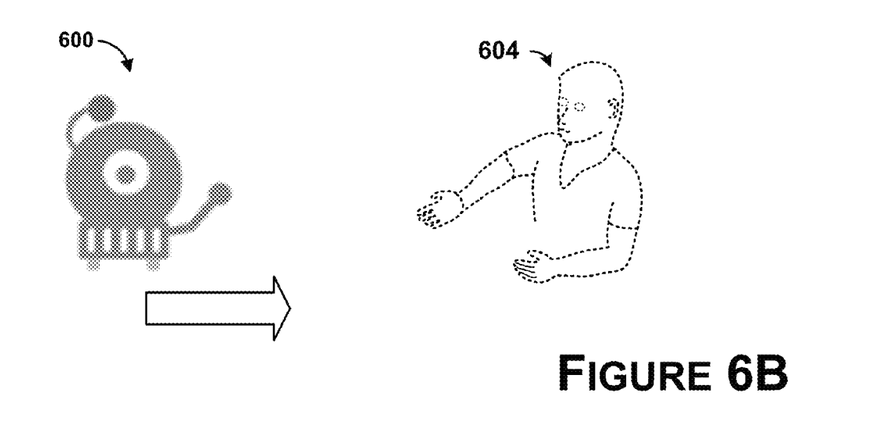
Figure 6C:
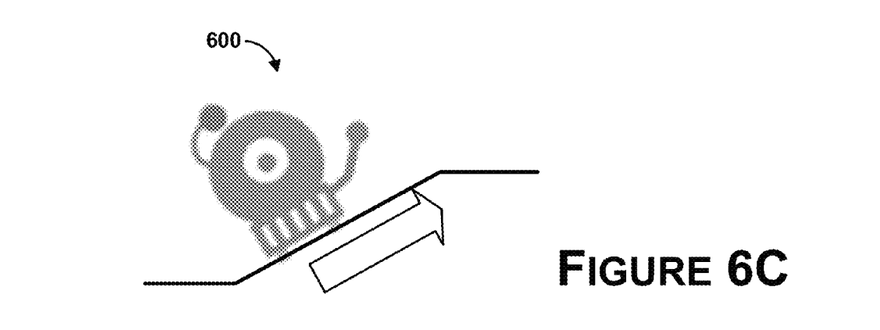

FIGS. 6A-6C are example conceptual illustrations of a robotic device 600 in an environment. In some examples, a velocity profile may be automatically selected by the robotic device or a device controlling the robotic device based on the environment in which the robotic device 600 is residing. In one example, the velocity profile may be selected based on the type of a surface (e.g., dirt, gravel, carpet, hardwood floor, etc.) over which the robotic device 600 is traversing.

In one example, as shown in FIG. 6A, the robotic device 600 may be approaching an object 602 within an environment. For example, the robotic device 600 may be a distance "d" (e.g., 10 feet) away from the object 602. Accordingly, a velocity profile allowing smooth velocity and acceleration changes may be provided. In some instances, the velocity profile may be selected based on the distance "d" in relationship to one or more distance thresholds. Thus, the robotic device 600 may safely or cautiously navigate near or around the object 602, or through the environment. In other examples, the robotic device 600 may access information associated with the environment, for example, a floor plan or map, and select a velocity profile based on the information.

In another example, as shown in FIG. 6B, the robotic device 600 may be approaching a user 604 recognized within the environment. Based on the recognition of the user 604, a velocity profile may be selected. For example, the velocity profile may limit an acceleration rate and deceleration rate associated with changes in velocity when the robotic device 600 is near or interacting with the user.

In yet another example, a velocity profile may be selected based on operating parameters of the robotic device 600 in an environment. As shown in FIG. 6C, the robotic device 600 may be attempting to climb an inclined surface. As a result, the operating parameters may indicate that the robotic device 600 may be using 80% of the maximum power provided by one or more of its motor controllers to climb a surface with a 10% elevation grade. In one example, a velocity profile may be selected such that the robotic device is prevented from increasing a magnitude of velocity. In another example, a velocity profile may be selected to limit an acceleration rate and deceleration rate of the robotic device while on the inclined surface. Selecting an appropriate velocity profile may be beneficial, for example, to reduce power consumption, heat dissipation, and/or wear and tear on the motor controllers by attempting to increase speed while climbing an inclined surface or prevent the robotic device from falling over due to rapid changes in acceleration/deceleration while on the inclined surface.

FIGS. 7A-7D are example illustrations of another interface 700. The interface 700 may be provided on a display 702 of a touchscreen. The interface may include a circle 704 and include a maximum magnitude circle 706 concentric with the circle 704. Inputs to the interface 700 may be received within an area of the maximum magnitude circle 706, for example. An indicator 708 may be provided at a location of an input to the interface 700. The interface 700 may also include a relative magnitude value 710 indicating a magnitude of velocity associated with the input relative to a maximum possible velocity. The interface 700 may also include orientation indicators 712, 714, 716, 718, and 720 (712-720) provided at a location representing the location of the input.

Figure 7A:
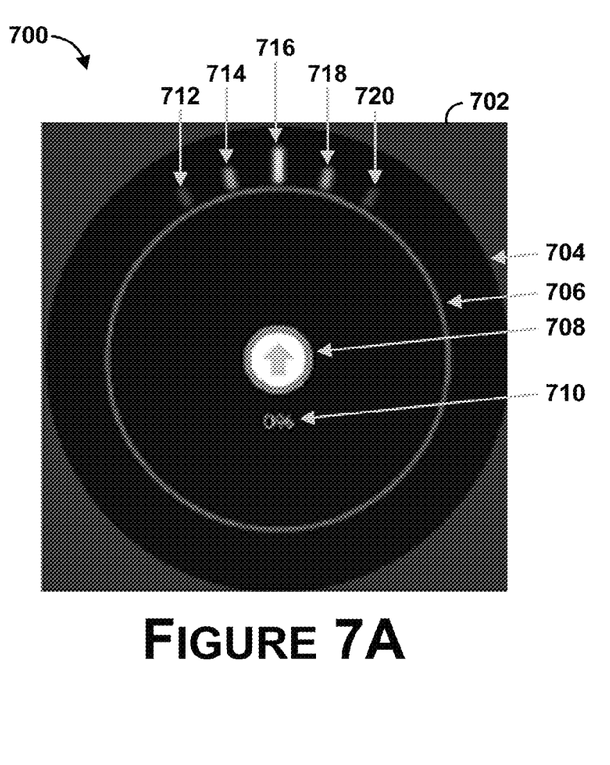
FIGS. 7A-7D are example illustrations of another interface.

As shown in FIG. 7A, the interface 700 is in a default position where a user has not started interacting with the interface 700. Thus, the indicator 708 is located in a center position and the relative magnitude value 710 is 0%.

Figure 7B:
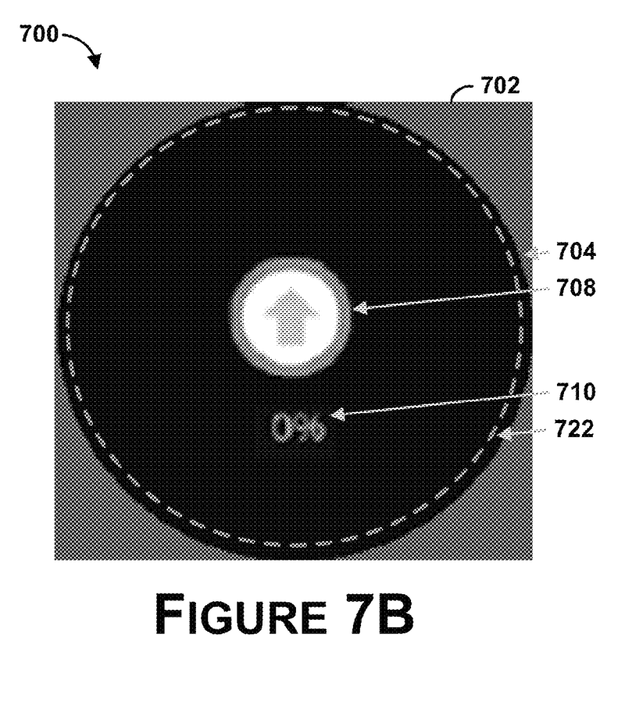

In some examples, the interface 700 may be modified based on information associated with an environment in which a robotic device is residing. For example, the interface 700 may be zoomed in such that a circumference of the maximum magnitude circle 706 is out of sight on the circle 704. As shown in FIG. 7B, the interface 700 has been zoomed in such that an inner portion of the maximum magnitude circle 706 is visible, but the circumference and portions of the maximum magnitude circle are out of sight. Thus, the interface 700 may no longer accept contacts associated with magnitudes of velocity above a threshold. In some examples, a display of a zoom circle 722 may be generated, indicating the interface 700 has been zoomed in.

Figure 7C:
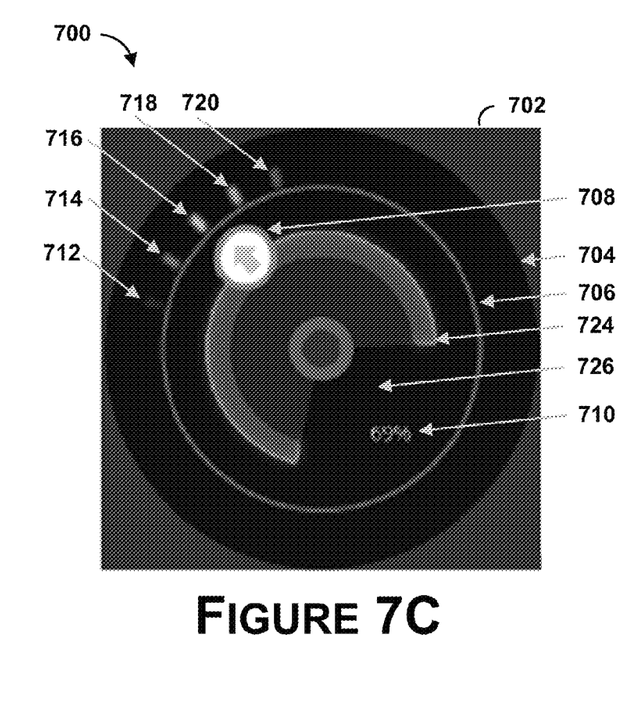

In another example of the interface 700, as shown in FIG. 7C, an input may be received corresponding to controlling a robot at 69% of the maximum possible velocity while also indicating to turn left. Thus, the indicator 708 is located in an upper-left quadrant of the circle 706. The interface 700 also includes a magnitude circle 724 indicating a current velocity as the relative magnitude value 710 of the maximum possible velocity. The relative magnitude value 710 may be a percentage (i.e., 69%) displayed within a cut-out arc 726 of the magnitude circle 724.

Figure 7D:
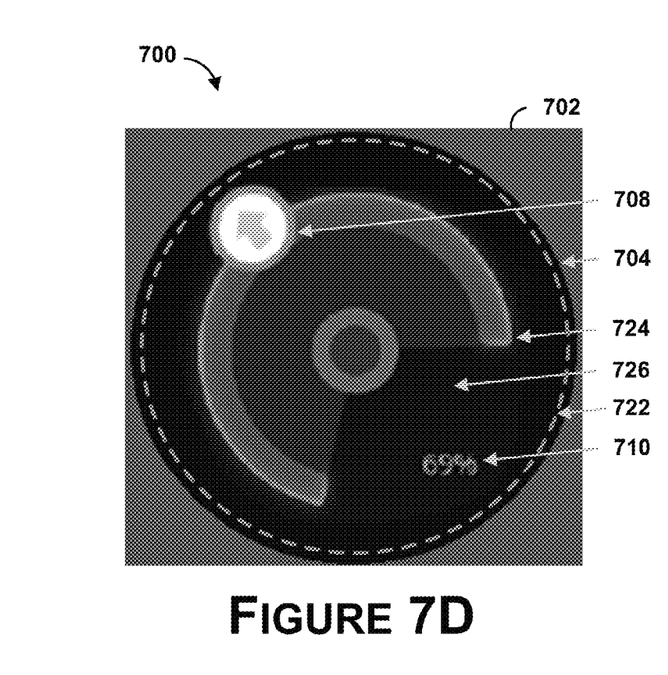

FIG. 7D shows another example of the interface 700, in a zoomed in state, while receiving an input corresponding to controlling a robotic device at 69% of the maximum possible velocity while also indicating to turn left.

Figure 8:
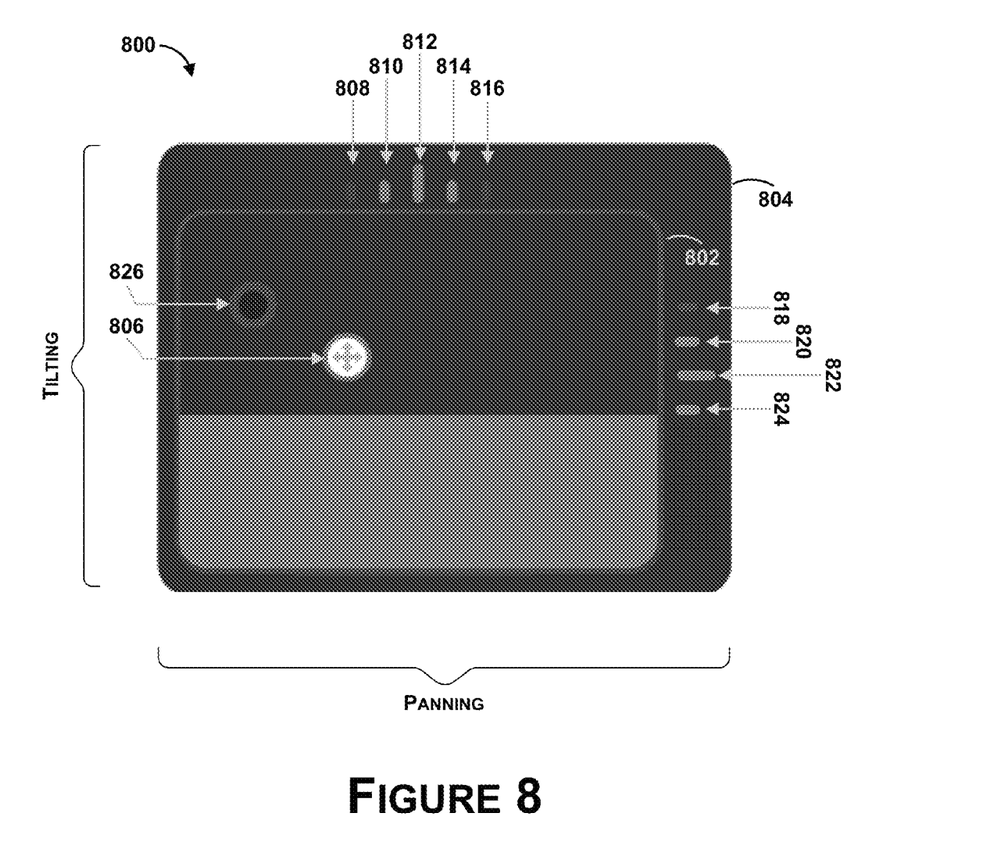
FIG. 8 is an example illustration of still another interface.

FIG. 8 is an example illustration of still another interface 800. The interface 800 is shown to be a substantially rectangular shape, and may include as structure two rectangles 802 and 804. The interface 800 may receive an input 806 at any location within the rectangle 802. The input 806 may be associated with pan and tilt values of a camera on a robotic device. The interface 800 may be associated with an x-y axis such that an x-axis coordinate of the input 806 is associated with a pan value, and a y-axis coordinate of the input 806 is associated with a tilt value. The interface 800 may be configured to provide an indicator (shown as a circle enclosing arrows) at a location of the input 806.

The interface 800 may be further configured to provide additional indicators that are representative of a location of the input. As shown, indicators 808, 810, 812, 814, and 816 may be provided along a perimeter of the rectangle 802 at x-axis coordinates that substantially match an x-axis coordinate of the location of the input 806. Similarly, the indicators 818, 820, 822, and 824 may be provided along a perimeter of the rectangle 802 at y-axis coordinates that substantially match an x-axis coordinate of the location of the input 806. The groups of indicators along the x-axis and y-axis perimeter of the rectangle 802 may be provided when inputs are received on the interface 800, for example.

The interface 800 may further provide an indicator 826 that represents current pan/tilt values of the camera on the robotic device to provide feedback to the user. A position of the indicator 826 on the interface 800 may be adjusted as inputs are received due to movement of the camera, for example.

In one example, the camera may be at a first position as indicated by the indicator 826. An input may be received at the location of the input 806. Based on the location of the input 806 with respect to the location of the indicator 826, a command may be generated to pan the camera to the right and tilt the camera downwards to a second position. The command may include information associated with magnitudes of velocity for panning and tilting the camera. Based on a selected velocity profile, a first velocity command for panning and a second velocity command for tilting may be determined prior to sending the command to a pan/tilt device controlling the camera. The first velocity command and the second velocity command may include information associated with gradually accelerating and decelerating rather than instantaneously accelerating from the first position to a given velocity until the second position is reached, and instantly decelerating from the given velocity to zero velocity. Thus, in some examples, jerky movements for the camera mounted on the pan/tilt device may be avoided or reduced.

In examples herein, interfaces are provided that may be configured to both receive inputs as well as provide outputs (e.g., touchscreen displays). For instance, an interface may be provided on a handheld computer that can receive an input and provide a display representative of the output.

In other examples, interfaces may be provided that are configured to receive inputs, and outputs may be provided by other devices. For instance, a motion-detection device may be configured to receive an input and to provide the input to a display device which displays an output representative of the input. The motion-detection device may include a camera, a depth sensor, microphones, etc., and may be configured to provide motion capture, facial recognition, and voice recognition capabilities. The depth sensor may be configured to include an infrared laser projector and a monochrome CMOS sensor that can capture video data in 3D under ambient light conditions. The motion-detection device may be configured to provide an interface using the infrared laser projector, for example, to receive inputs from users. The inputs can be associated with a selection of a velocity profile of a robotic device or a command for controlling the robotic device, for example. The interface may be viewable by a user, such as a laser projected interface, or may be a conceptual interface in which inputs are received due to motion of the user and the interface is not visible to the user.

The motion-detection device may be coupled to a display device, and may provide outputs to the display device. The motion-detection device may generate a display representative of the interface or representative of inputs to the interface, and provide the display to the display device (or may provide information associated with the inputs to the display device and the display device can generate the display). The display may include an indicator representing a location of a received input, and the indicator may be representative of the command for the orientation of the camera on the robotic device. The location of the received input can be associated with a physical or geographic location, or can be associated with a location on the display representative of the interface that maps to the location of the received input. For instance, a user may provide an input to the interface provided by the motion-detection device at a physical location, and the physical location can be mapped to a position on a display representative of the interface.

The motion-detection device or the display device may further be configured to determine a velocity command for the robotic device based on the selected velocity profile and the input, and to generate (or provide) a display of the velocity command on the display representative of the interface, for example.

Thus, in some examples, a first device may be configured to receive an input at an interface that may be provided by or on the first device, and a second device different from the first device may be configured to provide an output based on the input. As a specific example, a motion-detection device may receive an input, and an output can be provided on a display device coupled (either wired or wirelessly) to the motion-detection device. As another example, a user may provide an input on a device (e.g., a keyboard, mobile phone, computing device, etc.) that is coupled to a separate device (e.g., a display) on which an output is provided.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving via an interface on a device a request to modify a velocity profile for a robotic device while the robotic device is in use, wherein the device is configured to remotely control the robotic device, and wherein the velocity profile comprises information associated with changes in velocity of the robotic device over time;
    providing for display on the interface a representation of one or more of a plurality of velocity profiles for the robotic device;
    receiving via the interface a selection of the velocity profile for the robotic device, wherein the velocity profile is selected from among the plurality of velocity profiles;
    receiving via the interface an input indicating a command for controlling the robotic device, wherein the command includes a change in velocity; and
    determining a velocity command for the robotic device based on the selected velocity profile and the input, wherein the velocity command includes information associated with implementing the change in velocity over time.

2. The method of claim 1, wherein the plurality of velocity profiles comprise one or more of:
    a linear profile, a 7-segment S-curve profile, an asymmetric profile, an exponential profile, and a logarithmic profile.

3. The method of claim 1, wherein the representation comprises a graphical representation of the one or more of the plurality of velocity profiles.

4. The method of claim 1, further comprising:
providing an input module for receiving an additional velocity profile;
receiving information associated with characteristics of the additional velocity profile; and
adding the additional velocity profile to the plurality of velocity profiles.

5. The method of claim 1, further comprising:
receiving a selection of a first velocity profile and a second velocity profile, wherein the first velocity profile is associated with accelerations and the second velocity profile is associated with decelerations;
determining the velocity command based on the first velocity profile when the input indicates an acceleration; and
determining the velocity command based on the second velocity profile when the input indicates a deceleration.

6. The method of claim 1, wherein the interface comprises a graphical user interface configured to receive information associated with a contact of a touchscreen and to determine a velocity command based on the information associated with the contact.

7. The method of claim 6, wherein the graphical user interface is configured for the robotic device based on the selected velocity profile.

8. The method of claim 6, further comprising:
generating a display of an indicator on the touchscreen and at a location of the contact of the touchscreen, wherein a distance from a location of the indicator to a reference point on the graphical user interface represents a magnitude of velocity associated with the input.

9. The method of claim 8, further comprising:
generating a display of a second indicator on the touchscreen, wherein a second distance from a location of the second indicator to the reference point on the graphical user interface represents a second magnitude of velocity associated with the velocity command.

10. The method of claim 9, further comprising modifying the display of the second indicator such that the location of the second indicator approaches the location of the contact of the touchscreen over time based on the velocity command.

11. The method of claim 1, further comprising:
generating a control signal indicating the velocity command; and
providing the control signal to the robotic device.

12. The method of claim 1, further comprising:
receiving information associated with an environment in which the robotic device is operating;
selecting, by the device, an environment velocity profile based on the information associated with the environment, wherein the environment velocity profile limits a rate of change in velocity for the robotic device; and
determining the velocity command based on the environment velocity profile rather than the selected velocity profile.

13. The method of claim 12, wherein the information associated with the environment comprises a distance to an object in the environment.

14. The method of claim 12, wherein the information associated with the environment comprises an identification of a user in the environment.

15. The method of claim 12, wherein the information associated with the environment comprises an elevation profile.

16. The method of claim 1, wherein the interface comprises a graphical user interface configured to receive information associated with a contact of a touchscreen and to determine a velocity command based on the information associated with the contact, and the method further comprising:
receiving information associated with an environment in which the robotic device is operating; and
modifying the graphical user interface based on the information associated with the environment.

17. The method of claim 16, wherein modifying the graphical user interface comprises:
providing a zoomed-in view of the graphical user interface, wherein a portion of the graphical user interface configured to receive contact indicative of velocity commands associated with a velocity above a velocity threshold is out of sight on the graphical user interface.

18. The method of claim 1, further comprising:
receiving information associated with operating parameters of the robotic device, wherein the operating parameters relate to power consumption;
selecting, by the device, an environment velocity profile based on the information associated with the operating parameters of the robotic device, wherein the environment velocity profile limits a rate of change in velocity for the robotic device; and
determining the velocity command based on the environment velocity profile rather than the selected velocity profile.

19. A non-transitory computer readable medium having stored therein instructions executable by a computing device to cause the computing device to perform functions of:
receiving via an interface on the computing device a request to modify a velocity profile for a robotic device while the robotic device is in use, wherein the computing device is configured to remotely control the robotic device, and wherein the velocity profile comprises information associated with changes in velocity of the robotic device over time;
providing for display on the interface a representation of one or more of a plurality of velocity profiles for the robotic device;
receiving via the interface a selection of the velocity profile for the robotic device, wherein the velocity profile is selected from among the plurality of velocity profiles;
receiving via the interface an input indicating a command for controlling the robotic device, wherein the command includes a change in velocity; and
determining a velocity command for the robotic device based on the selected velocity profile and the input, wherein the velocity command includes information associated with implementing the change in velocity over time.

20. The computer readable medium of claim 19, wherein the instructions further comprise instructions executable by the computing device to cause the computing device to perform a function comprising:
receiving a selection of a first velocity profile and a second velocity profile, wherein the first velocity profile is associated with accelerations and the second velocity profile is associated with decelerations;
determining the velocity command based on the first velocity profile when the input indicates an acceleration; and
determining the velocity command based on the second velocity profile when the input indicates a deceleration.

21. The computer readable medium of claim 19, wherein the interface comprises a graphical user interface configured to receive information associated with a contact of a touchscreen and to determine a velocity command based on the information associated with the contact.

22. A system comprising:
a memory;
a processor coupled to the memory; and
instructions stored in the memory and executable by the processor to perform functions of:
- receiving via an interface on a device a request to modify a velocity profile for a robotic device while the robotic device is in use, wherein the device is configured to remotely control the robotic device, and wherein the velocity profile comprises information associated with changes in velocity of the robotic device over time;
- providing for display on the interface a representation of one or more of a plurality of velocity profiles for the robotic device;
- receiving via the interface a selection of a velocity profile for the robotic device, wherein the velocity profile is selected from among the plurality of velocity profiles;
- receiving via the interface an input indicating a command for controlling the robotic device, wherein the command includes a change in velocity; and
- determining a velocity command for the robotic device based on the selected velocity profile and the input, wherein the velocity command includes information associated with implementing the change in velocity over time.

23. The system of claim 22, wherein the interface comprises a graphical user interface configured to receive information associated with a contact of a touchscreen and to determine a velocity command based on the information associated with the contact, and further comprising instructions executable by the processor to perform a function comprising:
- generating a display of an indicator on the touchscreen and at a location of the contact of the touchscreen, wherein a distance from the location of the indicator to a reference point on the graphical user interface represents a magnitude of velocity associated with the input.

24. The system of claim 23, further comprising instructions executable by the processor to perform a function comprising:
- generating a display of a second indicator on the touchscreen, wherein a second distance from a location of the second indicator to the reference point on the graphical user interface represents a second magnitude of velocity associated with the velocity command.

25. The system of claim 22, further comprising instructions executable by the processor to perform functions comprising:
- receiving a selection of another robotic device to control via the interface;
- receiving another input via the interface; and
- determining another velocity command based on the selected velocity profile and the another input.

* * * * *